(12) United States Patent
Chen et al.

(10) Patent No.: US 6,654,610 B1
(45) Date of Patent: Nov. 25, 2003

(54) TWO-WAY PACKET DATA PROTOCOL METHODS AND APPARATUS FOR A MOBILE TELECOMMUNICATION SYSTEM

(75) Inventors: Xiaobao X. Chen, Swindon (GB); Mooi Choo Chuah, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/565,510

(22) Filed: May 5, 2000

(51) Int. Cl.⁷ ................................................. H04Q 7/20
(52) U.S. Cl. ........................ 455/450; 455/451; 455/452; 455/62; 455/422; 370/347; 370/348; 370/443; 370/461; 370/462; 709/214; 709/226
(58) Field of Search .................................. 455/450, 451, 455/452, 62, 422; 370/347, 348, 443, 461, 462, 458; 709/226, 214

(56) References Cited

U.S. PATENT DOCUMENTS

| | | | | |
|---|---|---|---|---|
| 5,590,133 A | * | 12/1996 | Billstrom | 370/349 |
| 5,995,503 A | * | 11/1999 | Crawley et al. | 370/351 |
| 6,031,827 A | * | 2/2000 | Rikkinen | 370/330 |
| 6,134,231 A | * | 10/2000 | Wright | 370/348 |
| 6,240,083 B1 | * | 5/2001 | Wright et al. | 370/348 |
| 6,377,803 B1 | * | 4/2002 | Ruohonent | 455/434 |
| 6,453,349 B1 | * | 9/2002 | Kano et al. | 709/226 |
| 6,496,479 B1 | * | 12/2002 | Shionozaki | 370/230 |
| 2001/0054103 A1 | * | 12/2001 | Chen | 709/226 |

FOREIGN PATENT DOCUMENTS

EP 1 130 931 A1 9/2001
WO WO 00/10357 2/2000

OTHER PUBLICATIONS

R. Braden, Editor, "Resource Reservation Protocol (RSVP)," Version 1 Functional Specification, RFC 2205, http://www.ietf.org/rfc/rfc2205, Sections 1 and 2, 28 pages, Sep. 1997.
A. Eriksson, "Real–Time Services Over the Internet," XVI World Telecom Congress Proceedings, pp. 173–179, 1997.

* cited by examiner

Primary Examiner—William Trost
Assistant Examiner—Danh Le

(57) ABSTRACT

Two-way resource reservation techniques for use in UMTS and other telecommunication systems. A determination is made as to whether a user requires resource reservations in both an uplink direction and a downlink direction within the system, and if the user requires such two-way resource reservations, a two-way protocol is implemented to establish the required resource reservations. The two-way protocol integrates resource negotiation procedures for both the uplink direction and the downlink direction so as to ensure that the required resource reservations are provided for both directions. The two-way protocol may be a Packet Data Protocol (PDP) based on a Resource Reservation Protocol (RSVP) resource negotiation procedure. The determination may be based on one or more flag bits which identify whether the user requires resource reservations for both the uplink and downlink directions. The flag bits may be associated with a Quality of Service (QoS) Information Element (IE) of the system, and may be used to permit the user to select between application of the two-way protocol and application of a one-way protocol.

20 Claims, 11 Drawing Sheets

TWO-WAY PACKET DATA PROTOCOL METHODS AND APPARATUS FOR A MOBILE TELECOMMUNICATION SYSTEM

FIELD OF THE INVENTION

The present invention relates generally to telecommunication systems, and more particularly to packet data protocols for use in such systems.

BACKGROUND OF THE INVENTION

In third generation telecommunication systems, such as the Universal Mobile Telecommunication System (UMTS), broad bandwidth is provided for services such as data and multimedia in addition to voice. It is desirable in such systems to provide users with an ability to establish a required Quality of Service (QoS). However, QoS cannot be guaranteed in certain types of networks, such as Internet Protocol (IP) networks or more generally the Internet, unless resources are reserved.

An end-to-end protocol known as Resource Reservation Protocol (RSVP) is currently used to allow these and other types of networks to reserve the resources required to provide a desired QoS. RSVP is described in Internet Engineering Task Force (IETF) RFC2205, Resource Reservation Protocol (RSVP), R. Braden et al., September 1997, which is incorporated by reference herein.

FIG. 1 illustrates the operation of RSVP. A transmitting user 10 sends to a receiving user 12 a PATH message. The PATH message carries traffic characteristics information such as information commonly known as "TSpecs" to indicate characteristics of the traffic that is to be sent from the transmitting user 10. When the receiving user 12 receives the PATH message, it sends a RESV message that contains a QoS request such as that commonly known as "FlowSpecs." In practice, the transmitting and receiving users 10 and 12 can be located remotely so that the PATH and RESV messages pass through several nodes of a network. As each node receives both messages, it makes the decision as to whether adequate resources in that node can be reserved. If this is possible, then the messages are relayed to the next hop for the PATH message and the previous hop for the RESV message. When the RESV message reaches the transmitting user 10, it begins to transmit data. Periodic refresh messages are sent subsequently to maintain the QoS status at each node that has been set up.

European Patent Application No. 00301782.9, filed Mar. 3, 2000 in the name of inventor X. Chen and entitled "Resource Reservation in 3G or Future Generation Telecommunication Network," subsequently published on May 9, 2001 as European Patent Application EP 1 130 931 A1, describes methods for reserving resources in third or future generations of wireless mobile networks such as UMTS. Advantageously, the methods described therein have no or minimal impact on existing architecture or QoS procedures, and minimize any extra signaling traffic associated with supporting RSVP in UMTS.

As indicated in FIG. 1, conventional RSVP is a unidirectional QoS signaling protocol that delivers a QoS request from a traffic receiver to a traffic transmitter. The negotiated QoS set up via RSVP applies only to the traffic flowing in the direction from the traffic transmitter to the receiver. For the negotiation of the QoS requirement of the traffic in the opposite direction, a separate RSVP session must be initiated.

A problem which arises in the implementation of RSVP in UMTS and other types of systems is that such systems generally make clear distinctions between QoS for traffic flowing in an uplink direction from a Mobile Terminal (MT) to the network and traffic flowing in a downlink direction from the network to the MT. For example, such a distinction is made in the QoS Information Element (IE) of the Packet Data Protocol (PDP) Context of the UMTS standard.

Direct extension of the existing one-way PDP Context to cover both uplink and downlink traffic can lead to a "racing" problem. More particularly, users may send RSVP messages for QoS control in the uplink direction independently from corresponding RSVP messages for QoS control sent in the downlink direction. Therefore, when a given MT and a corresponding Gateway GPRS (General Packet Radio Service) Support Node (GGSN) receive RSVP messages, different PDP context control procedures need to be initiated for the RSVP session associated with each direction. This may result in a successfully established PDP context in one direction but a failed PDP context in the opposite direction for a session that desires reserved resources in both directions.

It is therefore apparent that a need exists in UMTS or another type of telecommunication system for a two-way PDP context procedure that applies to both uplink and downlink traffic and which solves the above-described racing problem.

SUMMARY OF THE INVENTION

The present invention provides two-way packet data protocol (PDP) techniques for use in UMTS and other telecommunication systems.

In accordance with the invention, a determination is made as to whether a user requires resource reservations in both an uplink direction and a downlink direction within the system. If the user requires the two-way resource reservations, a two-way protocol is implemented to establish the required resource reservations. The two-way protocol integrates resource negotiation procedures for both the uplink direction and the downlink direction so as to ensure that the required resource reservations are provided for both directions. The two-way protocol may be a Packet Data Protocol (PDP) based on a Resource Reservation Protocol (RSVP) resource negotiation procedure.

The above-noted determination as two whether the user requires two-way resource reservations may be based on one or more flag bits which identify whether the user requires resource reservations for both the uplink and downlink directions. The flag bits may be associated with a Quality of Service (QoS) Information Element (IE) of the system, and may be used to permit the user to select between application of the two-way protocol and application of a one-way protocol. For example, a pair of flag bits may be used, with the values of the bits indicating whether the user needs no resource reservations in either the uplink direction or the downlink direction, resource reservations in only the uplink direction, resource reservations in only the downlink direction, or resource reservations in both the uplink and downlink directions. As another example, a single flag bit may be used to indicate for a given direction of resource reservation requirement whether or not the resource reservation requirement is coupled with a corresponding resource reservation requirement in the opposite direction.

Advantageously, the two-way protocol techniques of the present invention efficiently handle resource reservations for both uplink and downlink traffic, and overcome the racing problem inherent in the implementation of QoS in the current one-way PDP context of UMTS.

DETAILED DESCRIPTION OF THE INVENTION

The invention will be illustrated below in conjunction with an example telecommunication system of a type known as a Universal Mobile Telecommunication System (UMTS). Although the invention is particularly well suited for implementation in such a system, it should be understood that the techniques of the invention are more generally applicable to other types of telecommunication systems.

Figure 1:
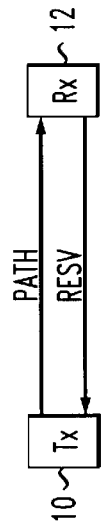
FIG. 1 illustrates the operation of a resource reservation protocol (RSVP) that may be utilized in conjunction with the invention.
Figure 2:
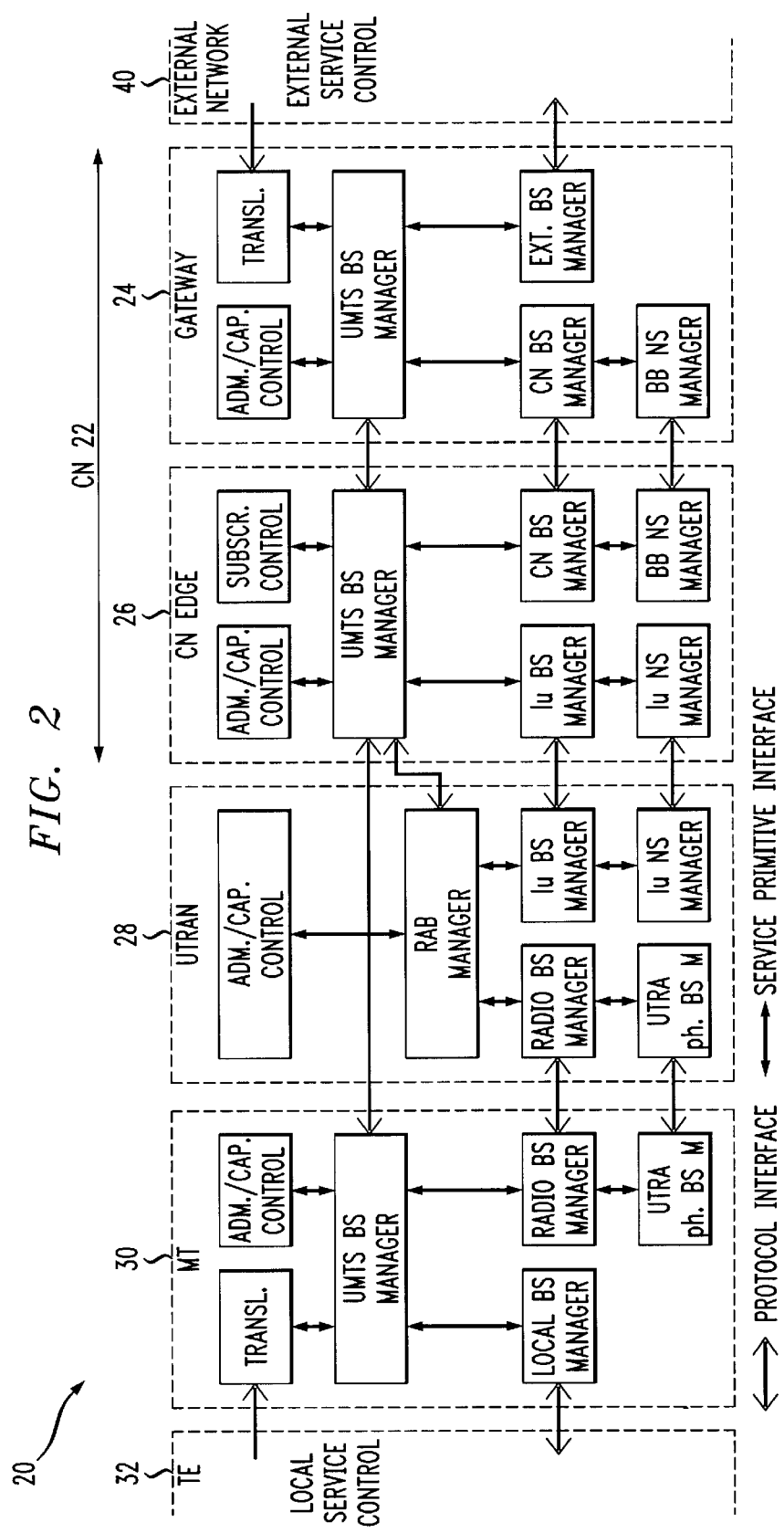
FIG. 2 is a block diagram of a telecommunication system in which the invention may be implemented.

FIG. 2 shows a portion of a UMTS 20 in which the present invention may be implemented. The UMTS 20 comprises a Core Network (CN) 22 formed by a Gateway 24 and a CN EDGE 26, and a UMTS Terrestrial Radio Access Network (UTRAN) 28. A Mobile Terminal (MT) 30 communicates with the UTRAN 28 via a radio interface. The MT 30 in this example is assumed to be UMTS-specific, and is connected to Terminal Equipment (TE) 32 that may run non-UMTS-specific applications. The Gateway 24 can communicate with External Network 40.

It should be noted that each illustrated component of UMTS 20 has sub-components which are shown in FIG. 2 but not further described herein. Additional details regarding the operation of UMTS 20 and its components and sub-components as illustrated in FIG. 2 can be found in the following UMTS standard documents, issued by the UMTS standard committee 3GPP: 3G TS 23.060 V3.2.1 (2000–01), Technical Specification Group Services and System Aspects: General Packet Radio Service (GPRS): Service Description (3G TS23.060 Version 3.2.1), and 3G TS23.107 V3.1.1 (2000–02) 3GPP-3rd Generation Partnership Project, Technical Specification Group Services and System Aspects: QoS Concept and Architecture. These standards documents are incorporated by reference herein.

Referring again to the UMTS 20 of FIG. 2, the above-noted sub-components include Translation elements, Admission/Capacity Control elements, UMTS, Local, Radio, UTRA, CN and external Bearer Service (BS) Managers, Network Service (NS) Managers, and a Real Time Bearer (RAB) Manager. The notation "ph" refers to physical, and the notation "Iu" denotes an interface specified in the above-cited 23.060 document. As previously noted, these and other elements of system 20 are described in greater detail in the UMTS standards documents.

The present invention provides a number of different techniques for implementing a two-way Packet Data Protocol (PDP) context for bidirectional QoS negotiation and control in the UMTS 20. These techniques will be described in detail below with reference to FIGS. 3A through 7. In these figures, the CN EDGE 26 is referred to as a Serving GPRS Support Node (SGSN) and the Gateway 24 is referred to as a Gateway GPRS Support Node (GGSN).

A number of basic assumptions are made for purposes of clarity and simplicity of illustration in FIGS. 3A through 7:

1. There has been a primary or default PDP context established for MT.
2. There has been no active secondary PDP context established for the existing RSVP session.

It should also be noted that subsequent description will also illustrate cases in which an active secondary PDP context has been set up for a two-way PDP context which does not yet contain complete QoS information for both directions.

The term "outstanding PDP context transaction" is used herein to refer to an unfinished Create PDP Request procedure, Activate PDP Request procedure or Update PDP Request procedure. A two-way PDP context without a complete QoS requirement is referred to as an incomplete two-way PDP context.

The two-way PDP context procedures of the present invention will be illustrated using two scenarios, a first scenario involving MT-only terminated RSVP, and a second scenario involving MT and GGSN terminated RSVP.

Scenario 1: MT-Only Terminated RSVP

For this scenario, it is assumed that only TE 32 and MT 30 generate RSVP signaling messages. The host within the external network 40 uses other signaling mechanisms to inform GGSN of its downlink QoS need and that such downlink QoS need is to be forwarded to MT.

Figure 3A:
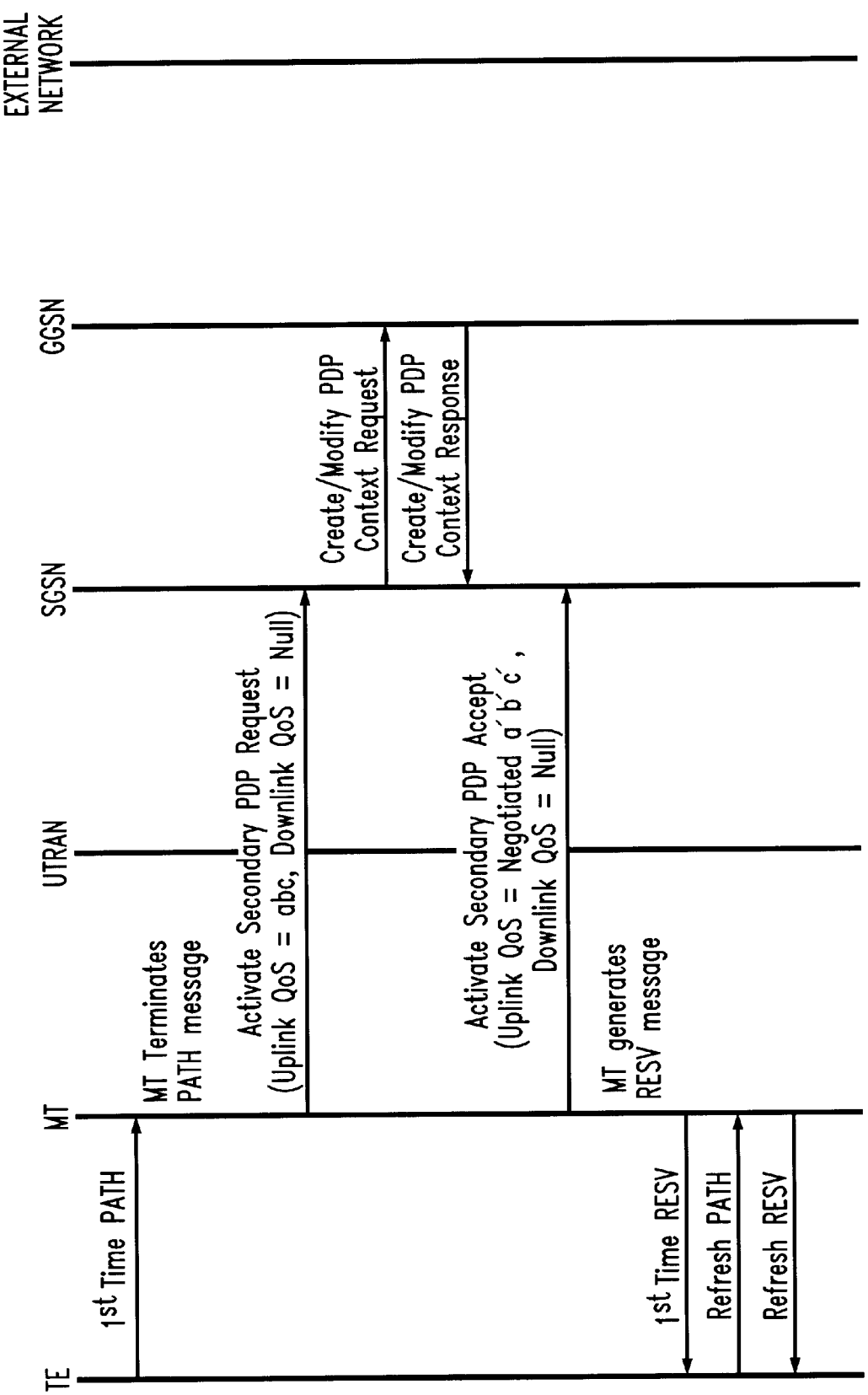
FIGS. 3A, 3B and 3C illustrate two-way packet data protocol (PDP) context procedures in accordance with an first operational scenario of the invention involving mobile terminal (MT)-only terminated RSVP.

FIG. 3A shows this scenario for uplink QoS. MT terminates the first-time PATH message and generates an Activate Secondary PDP Context Request message with appropriate Uplink QoS ("abc") to SGSN which in turns generates a Create Secondary PDP Context Request message to GGSN. Note that at this point, Downlink QoS is set to "Null." A Modify Secondary PDP Context procedure will be activated if a subsequent refresh PATH message presents different QoS or traffic specifications. In this scenario, refresh RESV messages are created carrying the new negotiated Uplink QoS ("a'b'c'") and sent to TE as a response.

Figure 3B:
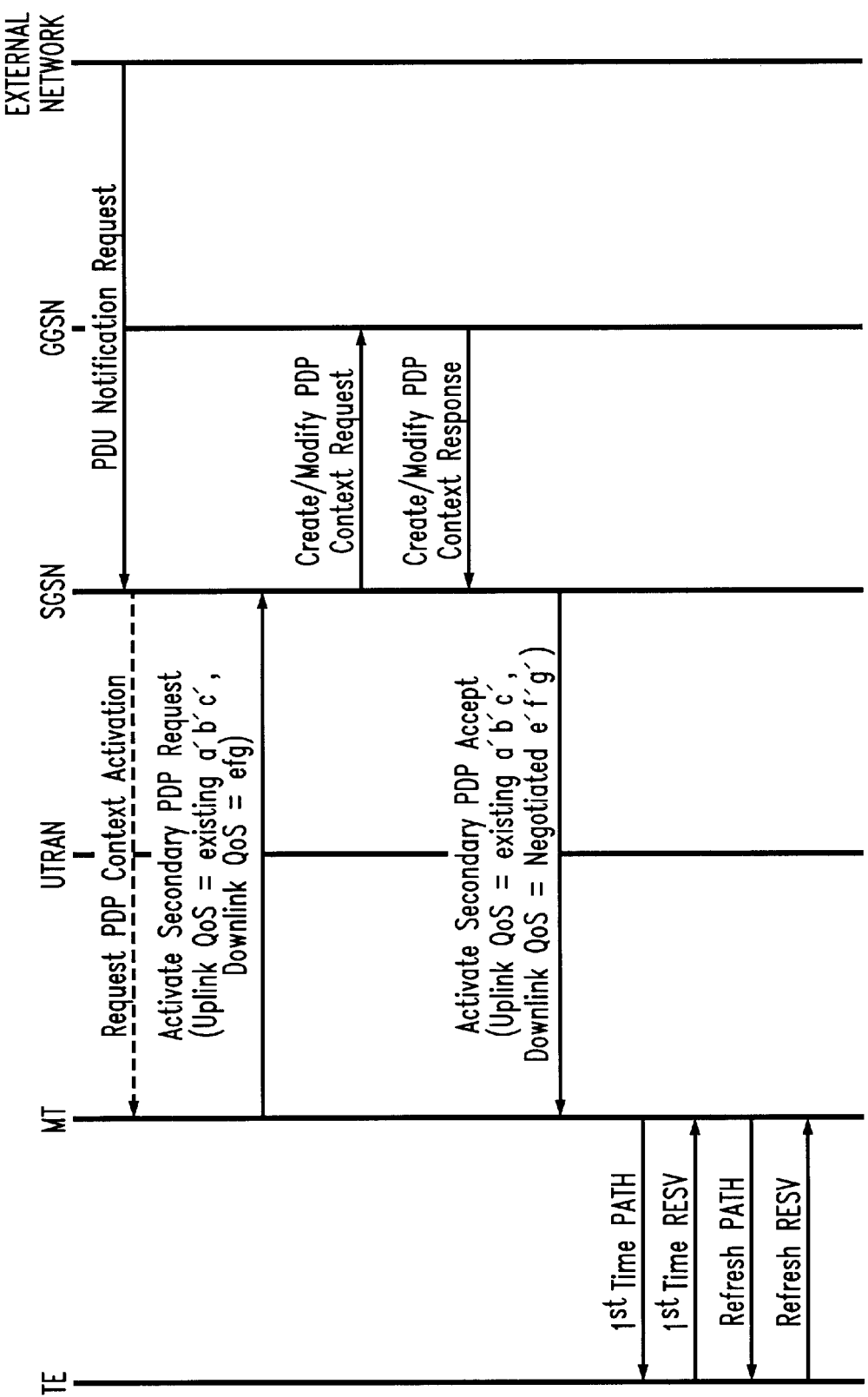
Figure 3C:
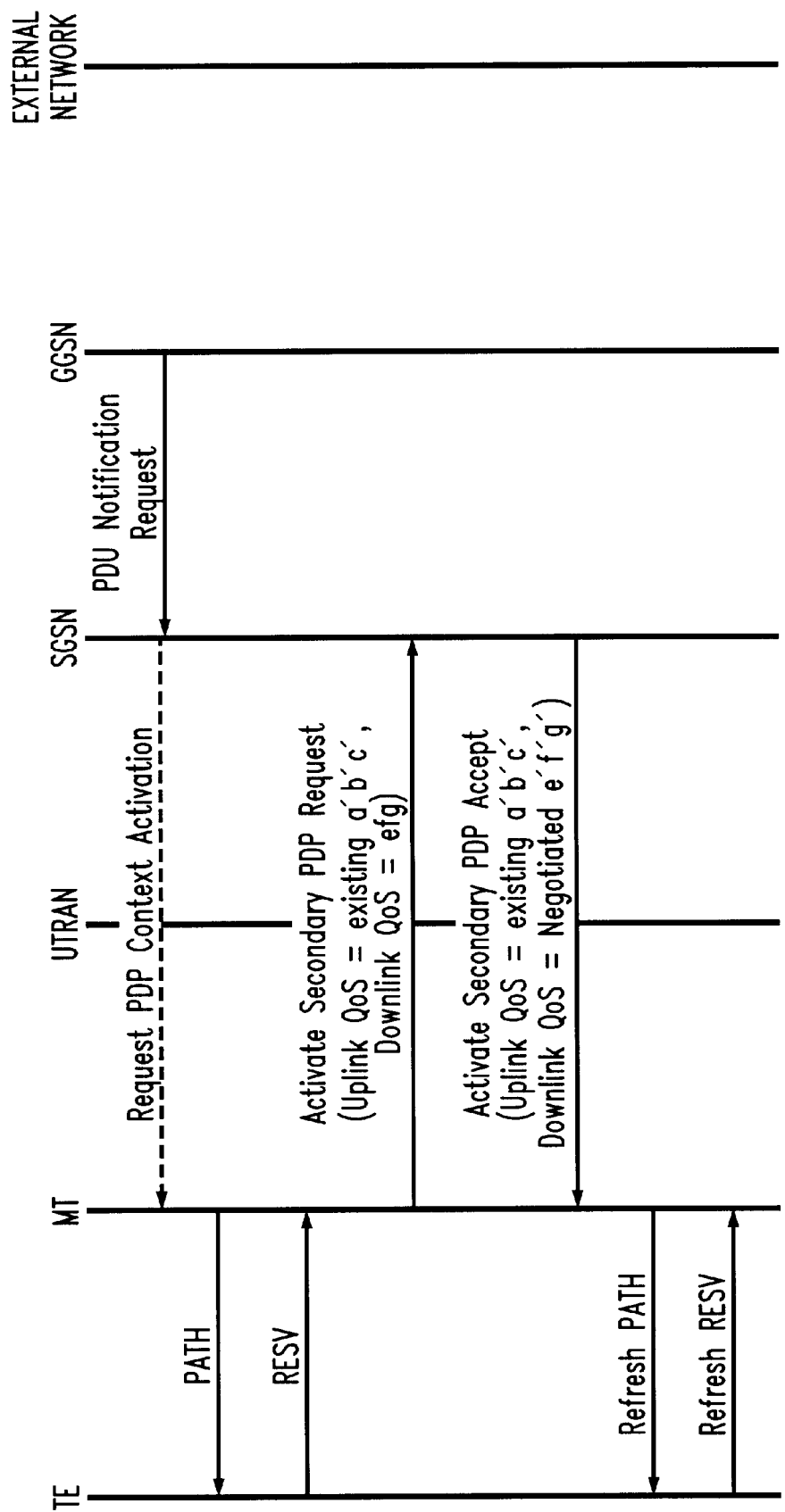

FIGS. 3B and 3C illustrate two different approaches for the Downlink QoS in this scenario. It is assumed for both approaches that a secondary PDP context exists. In both of these approaches, Uplink QoS is set to the existing "a'b'c'," and the initial requested Downlink QoS is set to "efg." The resulting new negotiated Downlink QoS is "e'f'g'."

In the first approach, illustrated in FIG. 3B, MT tries to set up a secondary PDP context before generating the PATH message to TE. Note that it is assumed that the network initiated Protocol Data Unit (PDU) notification carries downlink QoS parameters to MT. The Modify Secondary PDP Context procedure may need to be used to update the Downlink QoS for the following three conditions:

(a) the first-time RESV message from TE carries different QoS specifications;
(b) the refresh RSVP messages carries a different QoS specifications; and
(c) the Downlink QoS Change/Update request is initiated by the far end as carried by the "Network Requested PDP Message."

In the second approach, illustrated in FIG. 3C, MT activates secondary PDP context only after receiving RESV messages from TE. The Modify Secondary PDP Context procedure will only be used in the following two conditions:

(a) the refresh RSVP message carries different QoS specifications; and (b) the Downlink QoS Change/Update request is initiated by the far end as carried by the "Network Requested PDP Message."

It will be apparent to those skilled in the art that a suitable procedure for use in a case in which no secondary PDP context exists and PDU notification triggers the setting up of secondary PDP context can be generated in a straightforward manner from the diagrams of FIGS. 3B and 3C.

Scenario 2: MT and GGSN Terminated RSVP

Four different approaches will be described below for use in Scenario 2. A first approach is described in conjunction with FIGS. 4A and 4B, a second approach in conjunction with FIGS. 5A and 5B, a third approach in conjunction with FIGS. 6A and 6B, and a fourth approach in conjunction with FIG. 7.

For all of these approaches, GGSN can perform a network initiated Secondary PDP Context Request via the PDU notification request message to relay the PDU that contains the downlink QoS requirement. Receipt of a PDU notification at SGSN triggers it to send a Request PDP Context Activation message to MT. The receipt of such a Request PDP Context Activation message will trigger MT to initiate an Activate Secondary PDP Context Request message if no secondary PDP context exists.

In the first approach to Scenario 2, a first-time PATH message triggers an Activate 2nd PDP Context procedure. In this approach, both MT and GGSN will intercept the PATH and RESV messages, and will process the messages to determine if the messages are first-time messages or refresh messages. For refresh messages, both MT and GGSN will be able to tell if the QoS parameters change from the existing QoS requirements which are stored as part of a two-way PDP context.

For MT, receipt of a first-time. PATH message from TE will trigger an Activate Secondary PDP Context procedure if no secondary PDP context exists. If an incomplete two-way PDP context exists, then an Update PDP Context Request procedure is performed if there is no outstanding PDP context transaction. Subsequent arrival of refresh PATH messages at MT from TE are forwarded or carried as piggybacked information only if there are changes.

For MT, receipt of first-time RESV from TE will trigger an Update PDP Context procedure if an incomplete two-way PDP context exists. Subsequent arrival of refresh RESV messages from TE will trigger the Update PDP Context procedure only if the QoS parameters contained in these messages are different from the existing QoS parameters in a two-way PDP context. Upon receiving a Request PDP Context Activation message with QoS information from SGSN, an Activate 2nd PDP Context procedure will be initiated if no secondary PDP context exists.

For GGSN, a first-time PATH message from the external network is always forwarded transparently to MT. However, if GGSN realizes that there is no secondary PDP context for this RSVP session, then it will trigger the Network PDU notification to MT. When MT receives such a notification, MT can initiate an Activate 2nd PDP Context Request procedure. If an incomplete two-way secondary PDP context exists and there is no outstanding PDP context transaction, then an Update PDP context procedure is activated. If an incomplete two-way secondary PDP context already exists and an Update PDP Context procedure is taking place, then GGSN will not initiate yet another Update PDP Context and will instead rely on MT to do the correction for downlink QoS when MT receives the first-time RESV message from TE. Subsequent refresh PATH messages are forwarded by GGSN only if they contain QoS parameters that are different from the existing QoS parameters in a two-way PDP context. For GGSN, the first-time RESV message received from the external network will trigger an Update PDP Context procedure. Subsequent refresh RESV messages from the external network will trigger an Update PDP Context procedure only if there is a change in QoS requirements.

Figure 4A:
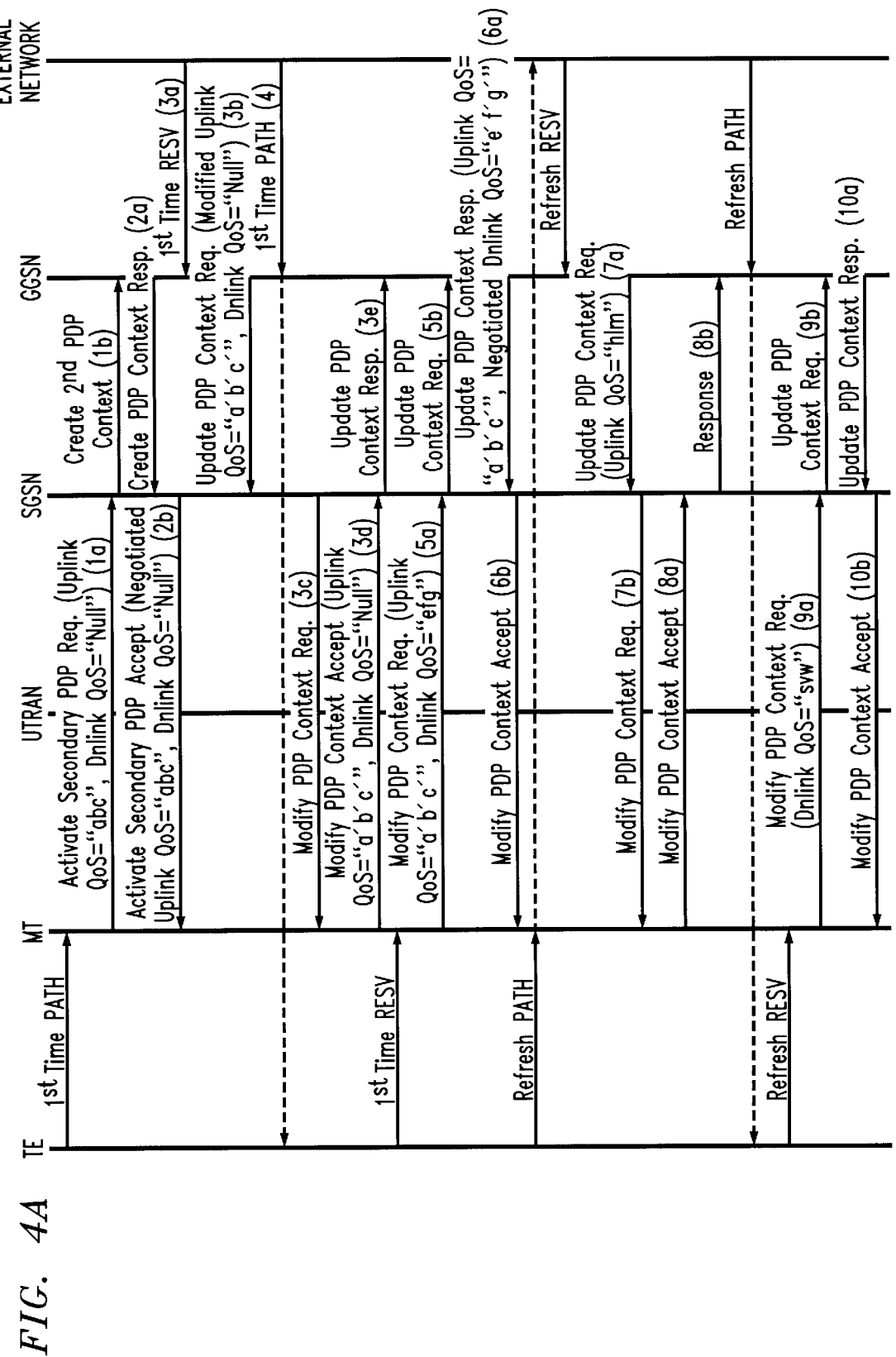
FIGS. 4A, 4B, 5A, 5B, 6A, 6B and 7 illustrate two-way PDP context procedures in accordance with a second operational scenario of the invention involving MT and Gateway GPRS (General Packet Radio Service) Support Node (GGSN) terminated RSVP.

FIG. 4A shows in greater detail the above-described procedure for establishing a two-way PDP context:

(1a) The arrival of the first-time PATH message from TE triggers the MT to generate an Activate Secondary PDP Context Request message to SGSN with Requested Uplink QoS parameters which are extracted from the QoS information within the PATH message.

(1b) The SGSN then triggers a Create Secondary PDP Context Request message to GGSN.

(2a) GGSN generates a Create Secondary PDP Context Response with Negotiated Uplink QoS parameters (may be different from Requested Uplink QoS) to SGSN. Both SGSN and GGSN may store session-related information, e.g., IP source and destination addresses for uplink and downlink directions, source and destination port numbers, etc., as part of the state of a two-way PDP context.

(2b) SGSN then generates an Activate Secondary PDP Context Accept to MT.

(3a) Meanwhile, the first-time RESV is received at the GGSN. GGSN will trigger an Update PDP Context Request procedure to update the negotiated uplink QoS if the QoS request in the RESV is different from what it already has.

(3b) This Update PDP Context Request message is relayed by SGSN to MT.

(3c) The MT will generate a Update PDP Context Response to SGSN.

(3d) SGSN relays this message to GGSN.

(4) Assume that meanwhile a first-time PATH message that contains downlink QoS requirement arrives at the GGSN. GGSN will not modify any QoS request but will simply treat this first-time PATH message as bearer data that needs to be delivered to the MT.

(5a) When MT receives the first-time RESV that carries the downlink QoS requirement, it initiates an Update PDP Context Request procedure with SGSN.

(5b) This message is relayed by SGSN to GGSN.

(6a)–(6b) GGSN will generate an Update PDP Context Response with appropriate Negotiated Downlink QoS to SGSN which relays it to MT.

(7a)–(7b) When a refresh PATH message is received, MT will only forward it provided there is a change. Similarly, when GGSN receives a refresh RESV message, GGSN will only trigger Update PDP Context Request with modified uplink QoS parameters, e.g., "hlm," provided the refresh RESV message contains changes in the uplink QoS requirements. The corresponding Update PDP Context response (8a)–(8b) is generated.

(9a)–(9b) Similarly, if refresh PATH messages are received by GGSN, they will only be forwarded provided there is a change. When a refresh RESV is received at the MT, it will only be forwarded provided there is a change. MT will also trigger an Update PDP Context Request with modified Downlink QoS parameters, e.g., "svw," whenever there is a change in the downlink QoS requirement within the refresh RESV message. The Update PDP Context Response will be generated by GGSN (10a) and relayed to MT by the SGSN (10b).

Figure 4B:
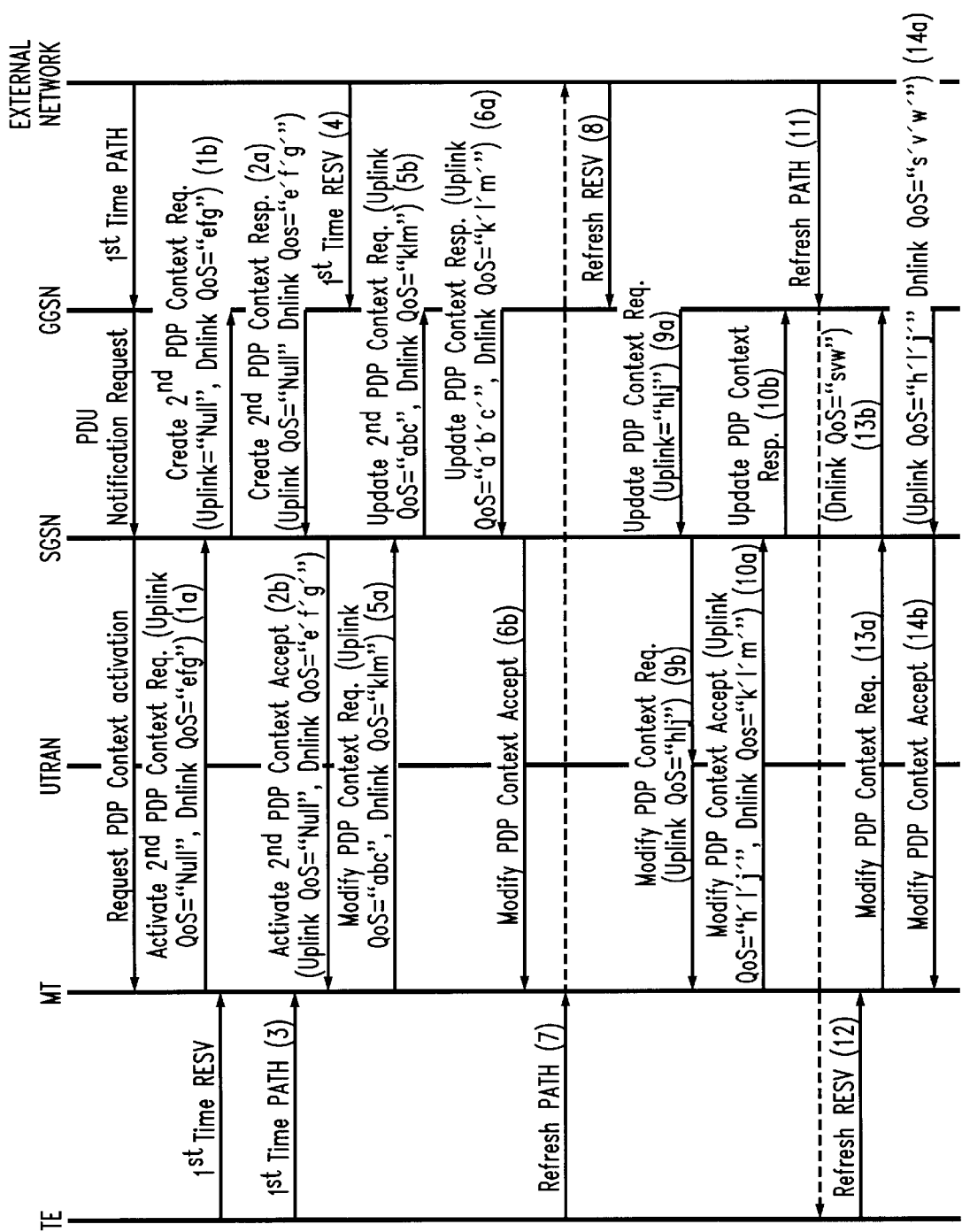

FIG. 4B illustrates the first approach to Scenario 2 in a case where the PDU notification request occurs first. Note that in this example, if a first-time PATH message from TE (3) arrives after the Update PDP Context Request procedure has been initiated (5a), then another Modify PDP Context procedure needs to be activated after procedure (5a) ends. Note that this will mean that the first-time RESV (4) won't arrive in time for its information to be included in (6a). Similarly, if the first-time RESV from the external network arrives later than the Update PDP Context Response generated by GGSN (6a), then yet another Update PDP Context procedure needs to be performed. Thus, under a worst case scenario, one Activate and three Update or Modify PDP Context procedures will be required. In general, this approach requires at least one Activate and two Update or Modify PDP Context procedures to complete a two-way PDP context set up. Example QoS parameters shown in the FIG. 4B approach include "klm" and "k'l'm'," "hlj" and "h'l'j'," and "svw" and "s'v'w'."

Note that in this scenario, it is not assumed that MT or GGSN wait for first-time PATH or RESV messages to trigger the UMTS PDP context signaling messages. However, it is assumed that SGSN and GGSN keep state information so that they can know if a message is a first-time PATH or RESV message and if a new two-way PDP context needs to be set up.

Figure 5A:
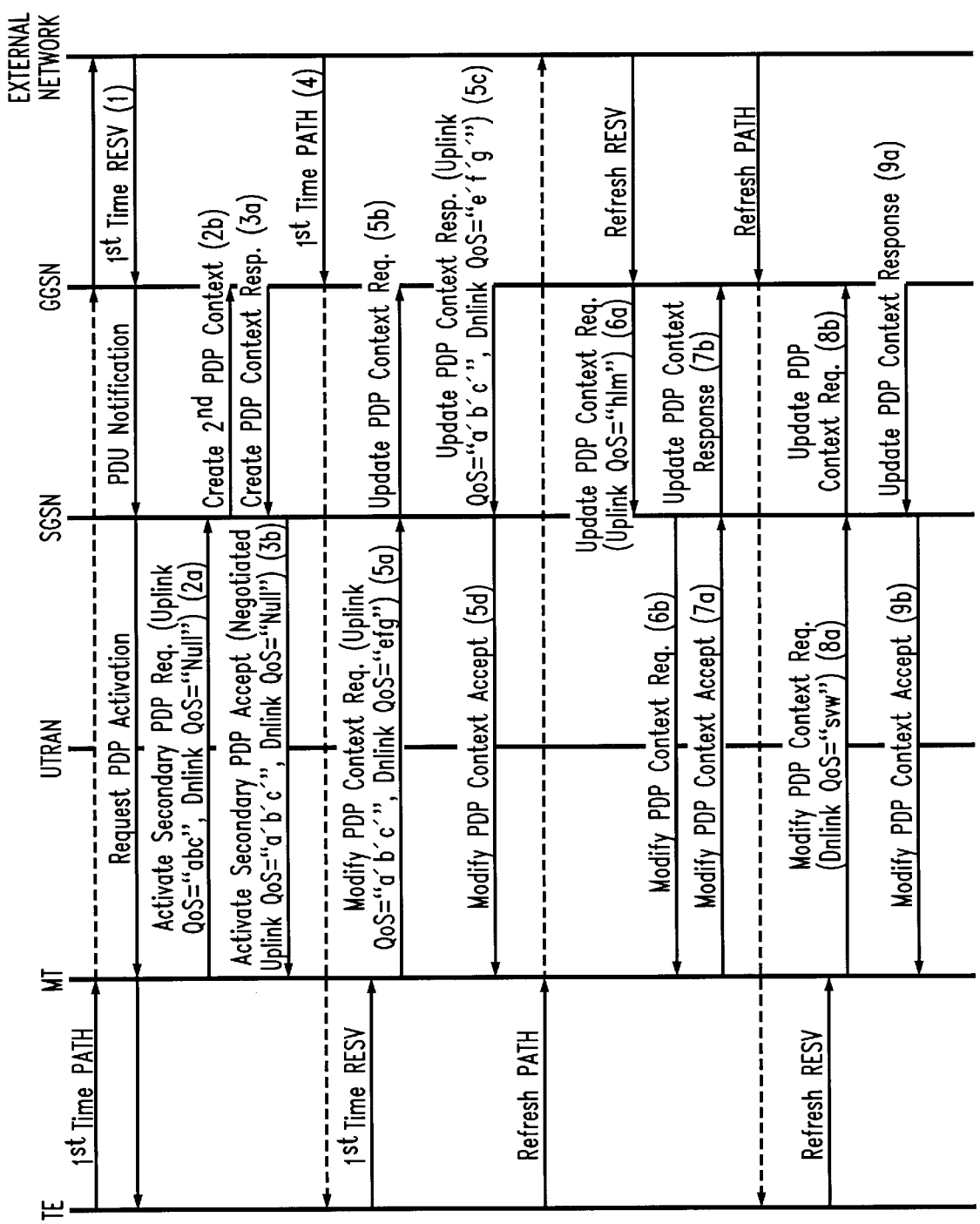
Figure 5B:
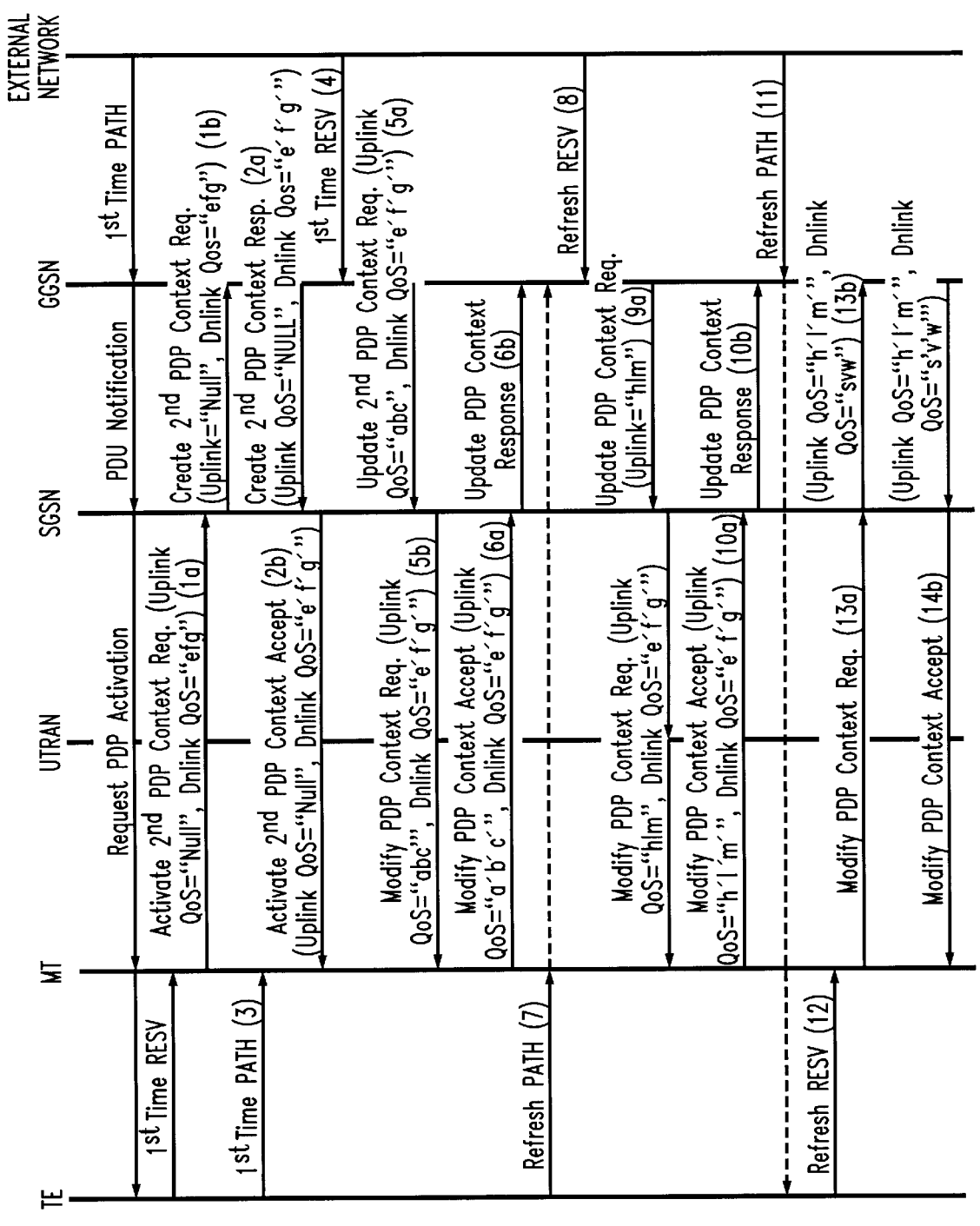

The second approach to Scenario 2, which will be illustrated in conjunction with FIGS. 5A and 5B, differs from the first approach to Scenario 2 in that MT initiates an Activate 2nd PDP Context Request only after receiving the first-time RESV message either for downlink or uplink traffic.

When MT receives the first-time RESV message from TE for downlink traffic, it will initiate an Activate 2nd PDP Context Request if none exists. For subsequent refresh RESV messages MT receives from TE, only those that contain changes in QoS requirements will trigger an Update PDP Context Request.

For the first-time PATH message, MT will transparently ship it across to the GGSN. For subsequent refresh PATH messages, MT will only forward when there are changes in Uplink QoS parameters.

For GGSN, when it receives a first-time PATH message from the external network, it will ship the packet transparently across the UMTS network to MT. For subsequent PATH messages, GGSN will only forward if there are any changes in the downlink QoS parameters. When GGSN receives a first-time RESV message for uplink traffic from the external network, it will initiate an Update PDP Context procedure if no other Activate or Update PDP Context procedure for the same session is taking place. Otherwise, the information in the first-time RESV can be used to update the downlink QoS Information Element (IE) within the Activate PDP Context Accept message. GGSN merely forwards the first-time RESV message received from MT for downlink QoS. For subsequent refresh RESV messages from the external network to GGSN, the Update PDP Context procedure will only be triggered if there is a change in uplink QoS requirements. For those RESV messages carrying downlink QoS requirements that GGSN receives from MT, GGSN merely forwards them to the external network.

FIG. 5A illustrates the above-described second approach to Scenario 2 for the case where a first-time PATH message arrives at MT first. MT will initiate the Activate 2nd PDP Context Request only after receiving the first-time RESV from TE.

FIG. 5B illustrates the above-described second approach to Scenario 2 for the case where a first-time PATH message at GGSN triggers the PDU notification. In this case, the first-time PATH message from the external host is carried transparently to TE using the existing Primary PDP Context.

The process illustrated in FIG. 5B is as follows:

(1a) When MT receives a first-time RESV from TE, it triggers an Activate Secondary PDP Context Request message with the downlink QoS parameters derived from the first-time RESV message to SGSN.

(1b) SGSN then sends the Create Secondary PDP Context Request message to GGSN.

(2a)–(2b) GGSN generates a Create Secondary PDP Context Response message which contains negotiated downlink QoS parameters to SGSN which then relays it to MT.

(3) First-time PATH message is received at MT and transported transparently across the UMTS network to the external host.

(4) First-time RESV is received at GGSN.

(5a)–(5b) GGSN triggers an Update PDP Context Request with uplink QoS parameters derived from the fist time RESV message to SGSN which relays it to MT.

(6a)–(6b) MT generates a Modify PDP Context Response with modified uplink QoS parameters to SGSN which relays it to GGSN.

(7)–(8) Refresh PATH message will be relayed from MT to GGSN only if there are changes. Similarly, only a refresh RESV message with changes received at GGSN will trigger the Update PDP Context procedure at GGSN to change the uplink QoS requirements.

(9a)–(9b) shows the Network Initiated Update PDP Context Request from GGSN to SGSN and from SGSN to MT.

(10a)–(10b) shows the corresponding response back from MT to SGSN and then to GGSN.

In the approach illustrated in FIGS. 5A and 5B, MT waits for a first-time RESV before initiating the Activate or Update Secondary PDP Context procedure. Therefore, only one activate and one Update PDP Context procedure are required to complete a two-way PDP context setup. However, waiting for the arrival of the first-time RESV message may result in a larger latency for setting up a two-way PDP context.

Figure 6A:
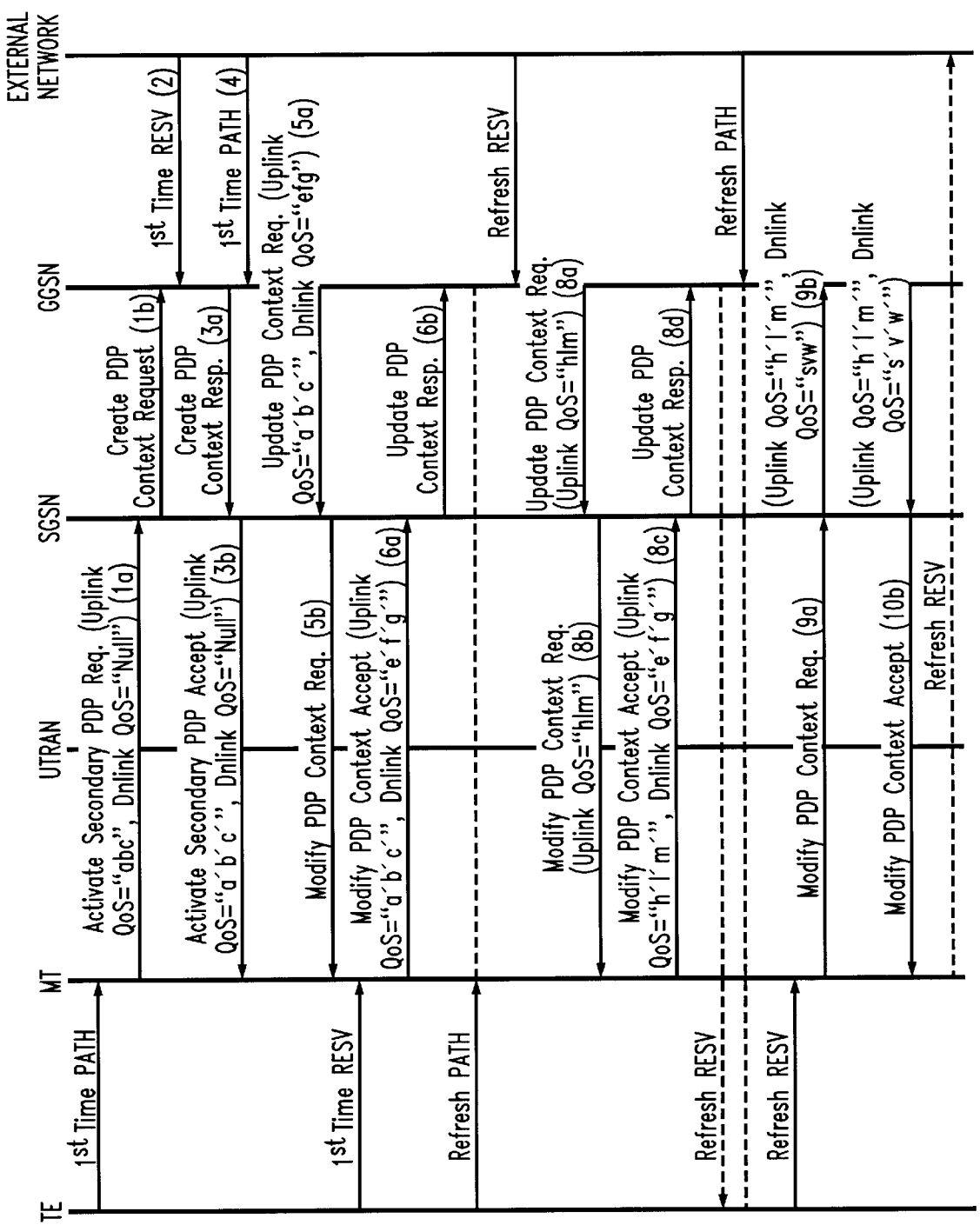
Figure 6B:
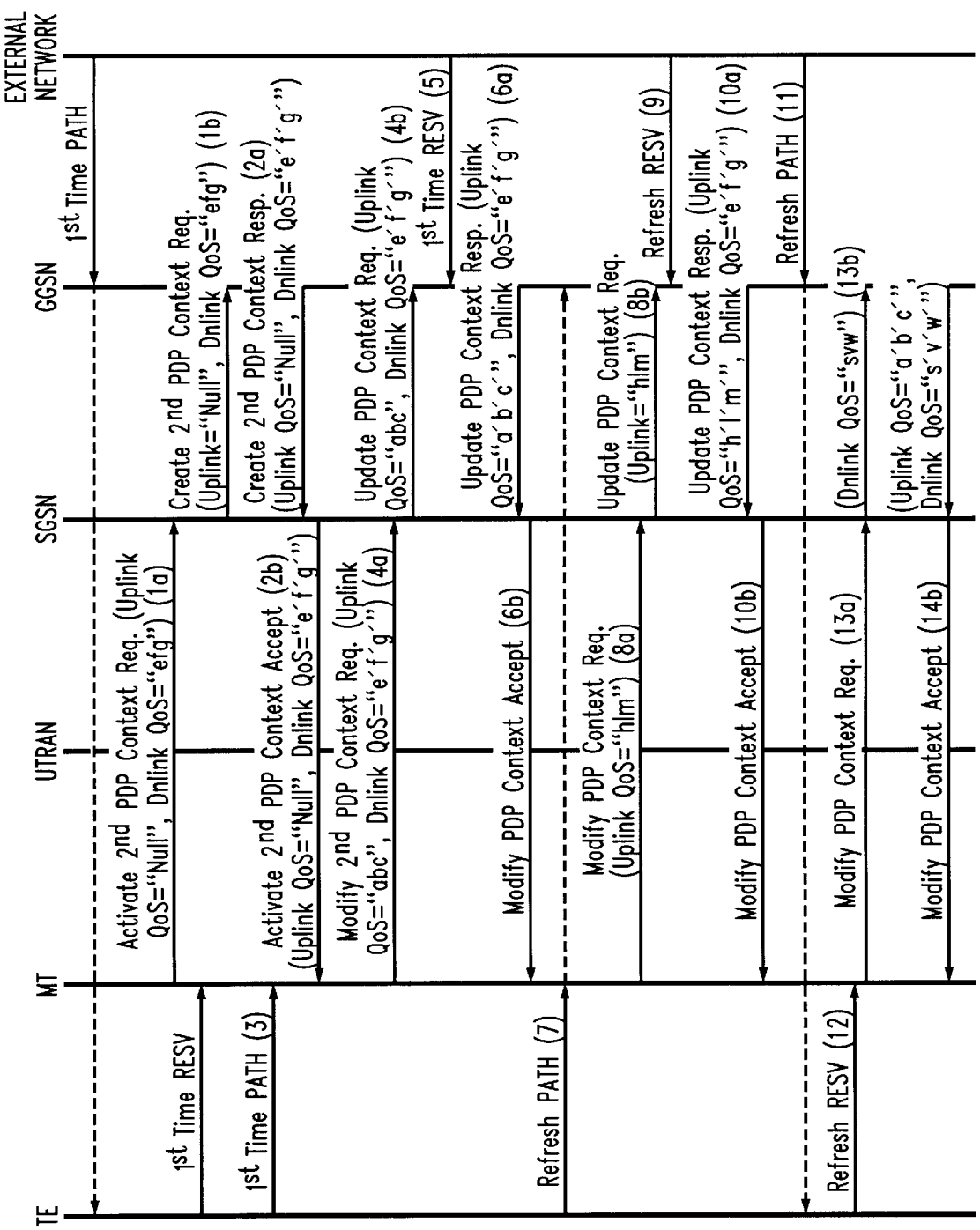

The third approach to Scenario 2 is illustrated in FIGS. 6A and 6B, and involves a PATH triggered Activate 2nd PDP Request with delayed PDP Response. This approach differs from the first approach to Scenario 2 in that the other PDP context peer waits for a first-time RESV message before responding to the PDP Context Request message from the sending peer. It differs from the second approach to Scenario 2 in that the first-time PATH message and not the first-time RESV triggers the Activate PDP Context Request procedure.

For MT, the receipt of the first-time PATH (Uplink QoS) message from TE will trigger an Activate Secondary PDP Context Request message to SGSN. Subsequent PATH messages from TE will only be forwarded provided there are changes to the QoS parameters. When MT receives the first-time RESV (downlink QoS) message from TE, it will trigger an Update PDP Context Request provided there is no outstanding PDP context transaction for the same session and an incomplete two-way PDP context exists. If there is an outstanding PDP context request that needs a response, MT will generate a response. Subsequent refresh RESV (downlink QoS) messages from TE will only be forwarded and trigger Update PDP Context Request procedures if there are changes in QoS requirements.

For GGSN, the receipt of first-time RESV (Uplink QoS) message from the external network will trigger the Create PDP Context Response back to MT if an outstanding PDP context transaction exists, and otherwise will trigger an Update PDP Context Request. Subsequent RESV messages from the external network will only be forwarded to MT and also trigger Update PDP Context Request procedures provided there are changes in the Uplink QoS requirement. When GGSN receives first-time or refresh PATH messages from MT, GGSN simply forwards them to the external network. When GGSN receives a first-time PATH message from the external network, it will forward the first-time PATH message transparently to MT. Subsequent refresh PATH messages from the external network are sent to MT only if there are changes in the Downlink QoS parameters.

FIG. 6A illustrates the above-described third approach to Scenario 2 for the case of the MT initiated Activate Secondary PDP Context procedure.

The process illustrated in FIG. 6A is as follows:

(1a)–(1b) When MT receives a first-time PATH message, an Activate Secondary PDP Context Request message is sent to SGSN with appropriate Request uplink QoS parameters. This message is relayed by SGSN to GGSN.

(2) GGSN will not generate a response until it hears a first-time RESV message from the external host.

(3a)–(3b) When GGSN receives the first-time RESV message, it will generate a PDP Context Response to SGSN which is then relayed to MT.

(4), (5a)–(5b) When GGSN receives a first-time PATH message, it will trigger an Update PDP Context Request message to SGSN which is then relayed to MT.

(6a)–(6b) MT will not generate a response until it hears the first-time RESV message from TE. Once this first-time RESV message is received, MT generates the Update PDP Context Response message with negotiated downlink QoS parameters and sends it to SGSN. SGSN will relay this message to GGSN.

Refresh PATH messages received at MT will only be forwarded only if they contain changes. Refresh RESV messages received at GGSN for uplink QoS negotiation will only be forwarded by GGSN provided there is a change.

Steps (8a)–(8d) show that GGSN will trigger an Update PDP Context Request procedure if there is such a change in uplink QoS parameters. MT will generate an appropriate response. Similarly, when GGSN receives a refresh PATH message, GGSN will only forward it if there is a change. When a Refresh RESV message arrives at MT, MT will initiate an Update PDP Context Request procedure with an appropriate Downlink QoS Request. GGSN will respond with an appropriate Negotiated Downlink QoS parameter in its Update PDP Context Response message to SGSN which is relayed to MT. MT will then relay the refresh RESV message. Note that proxies can be used at both MT and GGSN such that refresh messages are not relayed but instead regenerated at MT or GGSN.

FIG. 6B illustrates the third approach for the case of the network initiated Activate Secondary PDP Context procedure. In this case, the process waits until the first-time RESV message is received before generating the PDP Context Response. As a result, a minimal of one Activate and one Update PDP Context procedure are required to build a two-way PDP context using the third approach to Scenario 2. In some cases, one Activate and two Update PDP Context procedures may be required to build a two-way PDP context using this approach. In addition, it may be necessary to provide timers to deal with error cases when the relevant RESV messages do not arrive.

Figure 7:
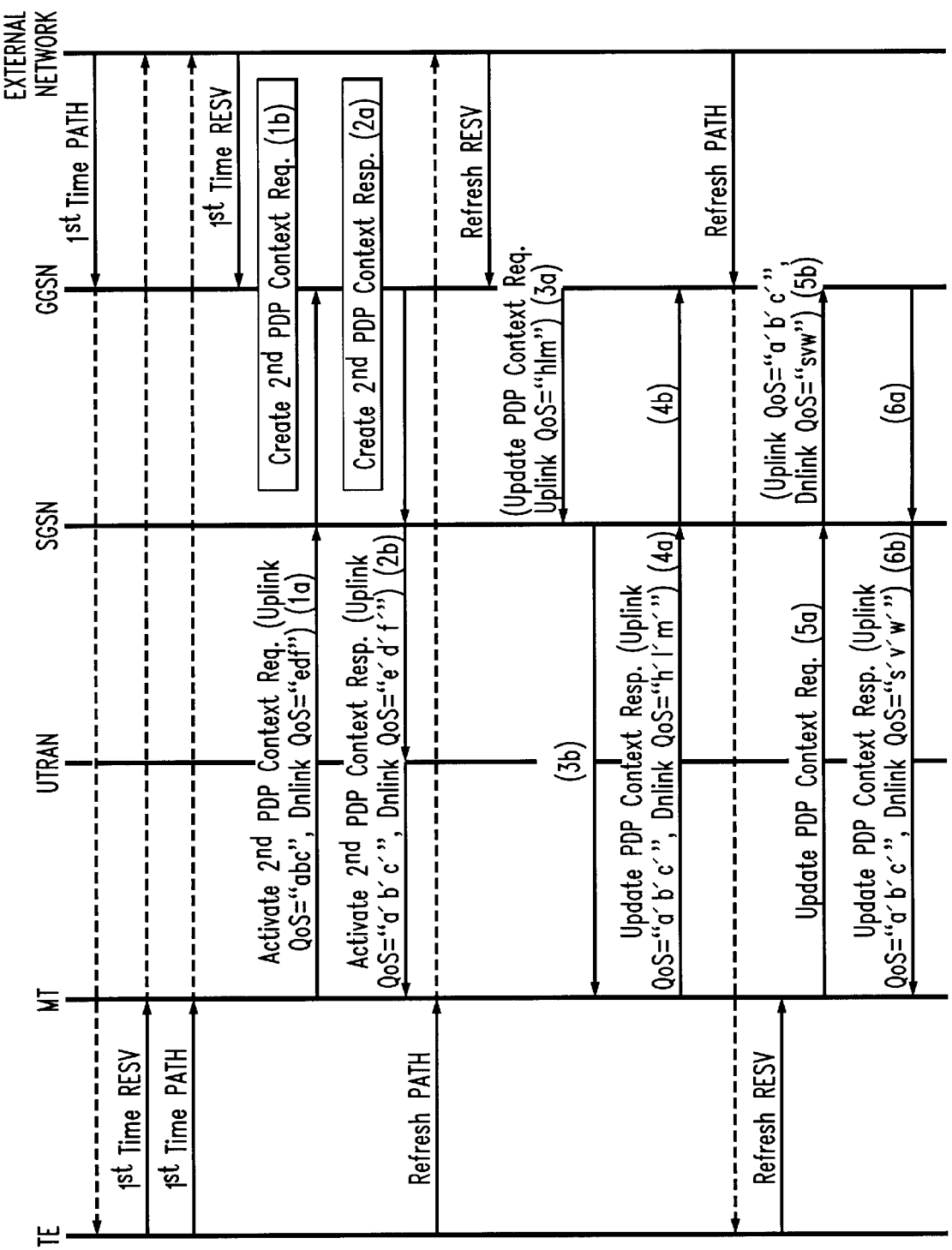

The fourth approach to Scenario 2 will be described in conjunction with FIG. 7. This approach differs from the previous approaches in that a secondary PDP context is built only after MT receives complete information on the QoS requirements for both directions. More particularly, MT triggers an Activate 2nd PDP Context Request message only after receiving both a first-time RESV message from TE and a first-time RESV message forwarded by GGSN. Subsequent refresh PATH messages from TE are relayed only if there is a change. Similarly, subsequent refresh RESV messages from TE are relayed only if there is a change. An Update PDP Context procedure will be initiated by MT if there is such a change.

In this fourth approach, GGSN will forward first-time PATH from the external network. Subsequent PATH messages received from the external network are relayed only when there is a change in QoS parameters. Receipt of the first-time RESV message from the external network will be forwarded to MT. Receipt of subsequent RESV messages from the external network will trigger an Update PDP Context procedure only if there is a change in QoS requirement.

For this approach, if PATH and RESV messages received by GGSN are relayed transparently to MT, then only MT needs to interpret RSVP signaling messages. However, if refresh PATH and RESV messages are relayed through the UMTS network only when there is a change, then both MT and GGSN need to interpret signaling messages.

Note that only one Activate 2nd PDP procedure needs to be performed to set up a two-way PDP context using this approach. However, the approach incurs a long set up delay for establishing a real-time second PDP context. Before a real-time second PDP context can be built, all bearer data can only be carried over a best-effort PDP context, which usually is the primary PDP context.

Among the above-described four approaches to Scenario 2, the second approach may be the preferred approach for UMTS, taking into consideration both the latency in setting up a real-time RAB and the number of signaling messages required to establish this real-time RAB. Of course, it should be understood that these and other approaches described herein are given by way of example, and the present invention can be implemented in other ways.

Modifications to Existing UMTS Standard to Support Two-Way PDP Context

This section describes certain changes that would be needed in the UMTS Core Network specification to support a two-way PDP context of the type described herein. As previously noted, this two-way PDP context overcomes the above-described racing problem. In order to support a two-way PDP context of this type, the following minor changes may be made in the UMTS Core Network Specifications:

(a) In order to provide a richer set of QoS negotiation capabilities, the following flags may be added to the QoS Information Element (IE), e.g., using two of the three unused bits in the fourth byte of the IE:

| Flg 1 | Flg 0 | |
|---|---|---|
| 0 | 0 | No RESV for both directions (one-way PDP context) |
| 0 | 1 | Only RESV for uplink direction (one-way PDP context) |
| 1 | 0 | Only RESV for downlink direction (one-way PDP context) |
| 1 | 1 | RESV for both uplink and downlink directions (two-way PDP context) |

If there is a separate QoS IE covering both uplink and downlink, a single flag may be added as follows:

| Flg 0 | |
|---|---|
| 0 | no QoS coupling with the opposite direction (one-way PDP context) |
| 1 | QoS coupling with the opposite direction (two-way PDP context) |

(b) It is assumed that an Uplink QoS IE and a Downlink QoS IE are included as part of the Activate PDP Context or Update PDP Context message. Different message types may be used to differentiate between the two so that a receiver of the Activate PDP Context or Update PDP Context message can easily tell whether QoS IEs for uplink, downlink or both are within the same message.

(c) Certain timers may be defined to handle the error situations for those approaches that wait for the RESV message before generating any PDP context related message.

(d) Uplink/Downlink QoS parameters may be added into the PDU notification Request message and the Request PDP Context Activation message. A delayed activation flag may be included in the Request PDP Context Activation message to let MT know if it needs to wait for any message from TE before activating the secondary PDP context.

The above-described embodiments of the invention are intended to be illustrative only. Alternative embodiments of the invention may utilize other types of signaling arrangements, and other types and arrangements of telecommunication system elements. These and numerous other alternative embodiments within the scope of the following claims will be apparent to those skilled in the art.

What is claimed is:

1. A method of establishing resource reservations in a telecommunication system, the method comprising the steps of:

determining if a user requires resource reservations in both an uplink direction and a downlink direction within the system; and implementing a two-way protocol to establish the required resource reservations, wherein the two-way protocol integrates resource negotiation procedures for both the uplink direction and the downlink direction so as to ensure that the required resource reservations are provided for both directions;

the two-way protocol determining particular values for one or more negotiable quality of service (QoS) parameters for at least one of the uplink direction and the downlink direction;

the determination of the particular values for one or more negotiable QoS parameters utilizing at least a first context involving a first set of system elements and a second context involving a second set of system elements, each of the first and second contexts corresponding to one or more of the negotiable QoS parameters;

the two-way protocol being configured so as to associate at least a subset of the one or more QoS parameters of the first context with at least a subset of the one or more QoS parameters of the second context.

2. The method of claim 1 wherein the telecommunication system is configured in accordance with the Universal Mobile Telecommunication System (UMTS) standard.

3. The method of claim 1 wherein the two-way protocol comprises a Packet Data Protocol (PDP).

4. The method of claim 1 wherein the two-way protocol first performs a resource reservation negotiation for the uplink direction, followed by a resource reservation negotiation for the downlink direction.

5. The method of claim 1 wherein the resource negotiation procedure comprises a Resource Reservation Protocol (RSVP) procedure.

6. The method of claim 5 wherein the two-way protocol is implemented in a system operating scenario in which RSVP signaling messages are terminated only at Mobile Terminal (MT) elements of the system.

7. The method of claim 5 wherein the two-way protocol is implemented in a system operating scenario in which RSVP signaling messages are terminated at both MT and Gateway GPRS (General Packet Radio Service) Support Node (GGSN) elements of the system.

8. The method of claim 1 wherein receipt of a first-time PATH message from a Terminal Equipment (TE) element of the system in an MT element of the system triggers a procedure to activate a secondary PDP context if no secondary PDP context exists.

9. The method of claim 1 wherein receipt of a first-time RESV message from a TE element of the system in an MT element of the system triggers a procedure to update a secondary PDP context if an incomplete two-way PDP context exists.

10. The method of claim 1 wherein receipt of a first-time PATH message from an external network element of the system in a GGSN element of the system causes an MT element of the system to trigger a procedure to activate a secondary PDP context if no secondary PDP context exists.

11. The method of claim 1 wherein receipt of a first-time RESV message from a TE element of the system in an MT element-of the system triggers a procedure to activate a secondary PDP context if no secondary PDP context exists.

12. The method of claim 1 wherein receipt in an MT element of the system of both a first-time RESV message from a TE element of the system and a first-time RESV message forwarded from an GGSN element of the system triggers a procedure to activate a secondary PDP context.

13. The method of claim 1 wherein the two-way protocol is implemented for a given MT element of the system after a primary or default resource reservation context has been established for the MT element.

14. A method of establishing resource reservations in a telecommunication system, the method comprising the steps of:

determining if a user requires resource reservations in both an uplink direction and a downlink direction within the system; and implementing a two-way protocol to establish the required resource reservations, wherein the two-way protocol integrates resource negotiation procedures for both the uplink direction and the downlink direction so as to ensure that the required resource reservations are provided for both directions;

wherein the determining step utilizes one or more flag bits to identify whether the user requires resource reservations for both the uplink and downlink directions.

15. The method of claim 14 wherein the one or more flag bits are associated with a Quality of Service (QoS) Information Element (IE) of the system.

16. The method of claim 14 wherein the one or more flag bits permit the user to select between application of the two-way protocol and application of a one-way protocol.

17. The method of claim 14 wherein the one or more flag bits comprise a pair of flag bits, with the values of the bits indicating whether the user needs no resource reservations in either the uplink direction or the downlink direction, resource reservations in only the uplink direction, resource reservations in only the downlink direction, or resource reservations in both the uplink and downlink directions.

18. The method of claim 14 wherein the one or more flag bits comprise a single flag bit indicating for a given direction of resource reservation requirement whether or not the requirement is coupled with a corresponding requirement in the opposite direction.

19. An apparatus for establishing resource reservations in a telecommunication system, the apparatus comprising:

one or more system elements operative to determine if a user requires resource reservations in both an uplink direction and a downlink direction within the system; and to implement a two-way protocol to establish the required resource reservations, wherein the two-way protocol integrates resource negotiation procedures for both the uplink direction and the downlink direction so as to ensure that the required resource reservations are provided for both directions;

the two-way protocol determining particular values for one or more negotiable quality of service (QoS) parameters for at least one of the uplink direction and the downlink direction;

the determination of the particular values for one or more negotiable QoS parameters utilizing at least a first context involving a first set of system elements and a second context involving a second set of system elements, each of the first and second contexts corresponding to one or more of the negotiable QoS parameters;

the two-way protocol being configured so as to associate at least a subset of the one or more QoS parameters of the first context with at least a subset of the one or more QoS parameters of the second context.

20. A machine-readable medium for storing one or more software programs for use in establishing resource reservations in a telecommunication system, wherein the one or more programs when executed provide the steps of:

determining if a user requires resource reservations in both an uplink direction and a downlink direction within the system; and implementing a two-way protocol to establish the required resource reservations, wherein the two-way protocol integrates resource negotiation procedures for both the uplink direction and the downlink direction so as to ensure that the required resource reservations are provided for both directions;

the two-way protocol determining particular values for one or more negotiable quality of service (QoS) parameters for at least one of the uplink direction and the downlink direction;

the determination of the particular values for one or more negotiable QoS parameters utilizing at least a first context involving a first set of system elements and a second context involving a second set of system elements, each of the first and second contexts corresponding to one or more of the negotiable QoS parameters;

the two-way protocol being configured so as to associate at least a subset of the one or more QoS parameters of the first context with at least a subset of the one or more QoS parameters of the second context.

\* \* \* \* \*